Aug. 15, 1933.  C. KUPPERS  1,922,543
AUTOMATIC COUPLING
Filed May 25, 1932
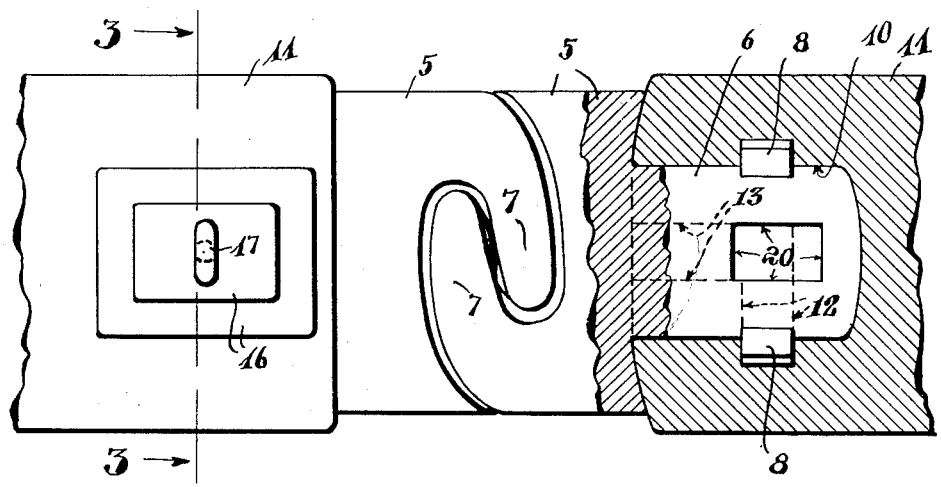
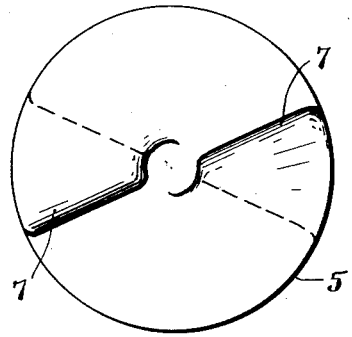
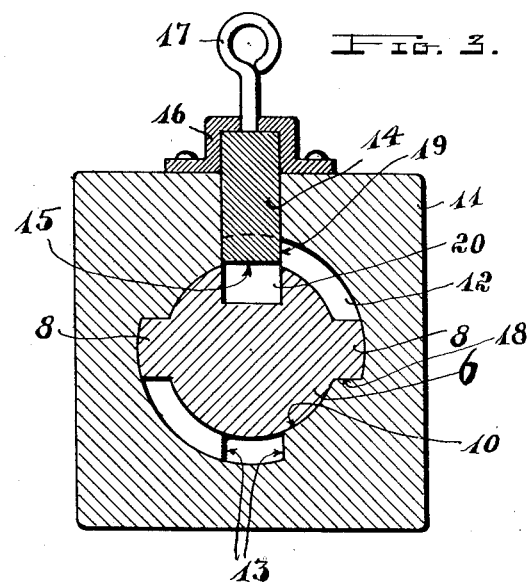
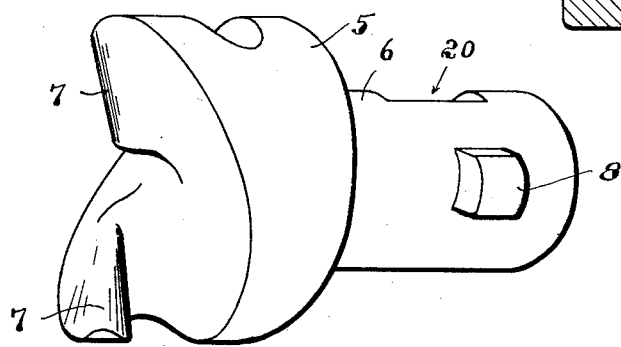
INVENTOR:
CARL KUPPERS,
By: *Otto L. Kruger*,
his Atty.

Patented Aug. 15, 1933

1,922,543

UNITED STATES PATENT OFFICE 1,922,543

AUTOMATIC COUPLING

Carl Kuppers, Culver City, Calif.

Application May 25, 1932. Serial No. 613,475

2 Claims. (Cl. 213—174)

This invention relates to couplings by which different devices can be connected automatically, particularly for connecting railroad cars.

One of the objects of this invention is to provide a simplified but durable and effective coupling.

Another object is to provide coupling-members that will automatically assume the open position when unlatched and pulled apart.

Another object is to provide coupling-members in pairs that will automatically be turned into closing position upon being pressed against each other.

Other objects will appear from the following description and appended claims as well as from the accompanying drawing, in which:—

Fig. 1 is a top plan view of oppositely engaged coupling members partly broken away to show inside engagements.

Fig. 2 is an end elevation of one coupling member.

Fig. 3 is a cross-section on line 3—3 of Fig. 1.

Fig. 4 is a perspective view of one disassembled coupling member.

Reference to railroad couplings is merely made to give an idea as to how this coupling can be used though, of course, many other uses are possible with the device disclosed herewith and I do not limit myself to the above reference alone.

As illustrated, the oppositely disposed coupling members are similar in every respect, being well represented by the perspective illustration in Fig. 4, having the principal parts of a head portion 5 and a shaft portion 6.

The head portion 5 of each coupling-member is provided with a pair of helically shaped jaw-members 7 which are so formed that the two oppositely disposed heads will screw into engaging position with respect to each other when pressed together, such engaging position being illustrated in top view in Fig. 1.

The shaft portion 6 of each of the coupling-members is provided with lugs 8 on the opposite sides of the shaft portion by which the coupling-members are mounted in suitable sockets for limited turning movements.

When used as railroad couplings, such sockets 10 are provided in the ends of the draw bars, of which portions are indicated at 11, of railroad cars, not shown in the drawing.

In the cross-section of Fig. 3, segmental annular grooves are indicated at 12, providing for the limited turning movements of the coupling shaft portion 6 by means of the lugs 8 disposed in these grooves 12.

In order to facilitate the axial shifting of the shaft portion 6 of a coupling-member into the socket 10 of a draw bar, longitudinal grooves 13 are provided, extending from the front end of the draw bar to the annular grooves 12, so that a coupling-member can be pushed axially into the end of a draw bar and then by a short twist be brought into proper position within the draw bar.

In this position, a coupling-member is held against removal from the draw bar by a stop bolt 14, the inner-most end 15 of the bolt being always in a position to prevent a turning of the coupling shaft portion 6 to the extent that the lugs 8 could reach the longitudinal grooves 13. The bolt 14 is for this reason encased by a cover 16, limiting the outward movement of the bolt, a handle 17 extending through the cover outwardly by which the bolt can be set or controlled.

When the bolt 14 is held in the position illustrated in Fig. 3, a coupling-member is free for the limited turning movements between the shoulder 18 of the annular groove 12 on the one end and the bolt 14 on the other end, the stopping point being indicated by the arrow 19, of such limited turning movement.

When oppositely disposed coupling-members have been brought to the engaging position illustrated in Fig. 1, the shaft portion 6 can be locked by the bolt 14, for which purpose a recess 20, see Fig. 3, is provided in the shaft portion 6, into which the bolt 14 can drop when properly aligned with recess 20 after the coupling-member has been turned into engaging position to this extent.

Having thus described my invention, I claim:

1. In a coupling, a supporting-member having a socket in its end with longitudinal grooves open in the end and terminating in the socket and there being also segmental annular grooves in communication with the first-named grooves, the supporting member having furthermore a slot through its side in communication with the socket, a cap over the slot, a coupling member having helical-shaped jaw-portions on its front end and having a shaft portion turnably mounted in said socket, lugs on the said shaft-portion shiftable through said longitudinal grooves and movable in said annular grooves limiting the turning movement of the shaft in the socket when the lugs reach the end-walls of the segmental annular grooves, the said shaft having furthermore a recess, and a bolt shiftably mounted in said slot and designed to drop into said recess for locking the coupling member against turning movements, the bolt being furthermore designed to be limited in its shifting movements by said cap to an extent to reach into said annular groove when the bolt is in its outermost position to thereby limit the turning movement of the said shaft to such an extent that said lugs cannot reach said longitudinal grooves while the said cap and bolt are in such a position.

2. In a coupling, a supporting-member having a socket in its end with longitudinal grooves in its cylindrical wall and segmental annular grooves in communication with the first-named grooves, a coupling-member having helical shaped jaw-members on its front end and having a shaft portion turnably and shiftably mounted in said socket, lugs on the coupling-member shiftable through said longitudinal grooves and turnable in said annular grooves together with said shaft in the supporting-member, the said shaft having a recess, and a bolt in the supporting-member designed to drop into said recess for locking the coupling-member against turning movements within the supporting-member.

CARL KUPPERS.